No. 635,338. Patented Oct. 24, 1899.
W. MURCHISON.
BOTTLE FILLING MACHINE.
(Application filed Feb. 11, 1899.)
(No Model.)

Witnesses.

Inventor.
William Murchison
by Fetherstonhaugh & Co
attys.

UNITED STATES PATENT OFFICE.

WILLIAM MURCHISON, OF TORONTO, CANADA.

BOTTLE-FILLING MACHINE.

SPECIFICATION forming part of Letters Patent No. 635,338, dated October 24, 1899.

Application filed February 11, 1899. Serial No. 705,327. (No model.)

*To all whom it may concern:*

Be it known that I, WILLIAM MURCHISON, chemist, of the city of Toronto, in the county of York, in the Province of Ontario, Canada, have invented certain new and useful Improvements in Bottle-Filling Machines, of which the following is a specification.

My invention relates to improvements in bottle-filling machines; and the object of the invention is to provide a simple device whereby any desired number of bottles may be filled and the liquid stopped from entering or started to enter each bottle simultaneously; and it consists, essentially, of a suitable casing containing the liquid provided with a series of faucets having a tube extending through the same intermediate of their length, such tube being provided with a bar having a series of orifices corresponding in size to the exit-orifice of the faucets, such bar being designed to be adjusted longitudinally or turned as desired, so as to stop the flow of the liquid, as hereinafter explained.

Figure 1:
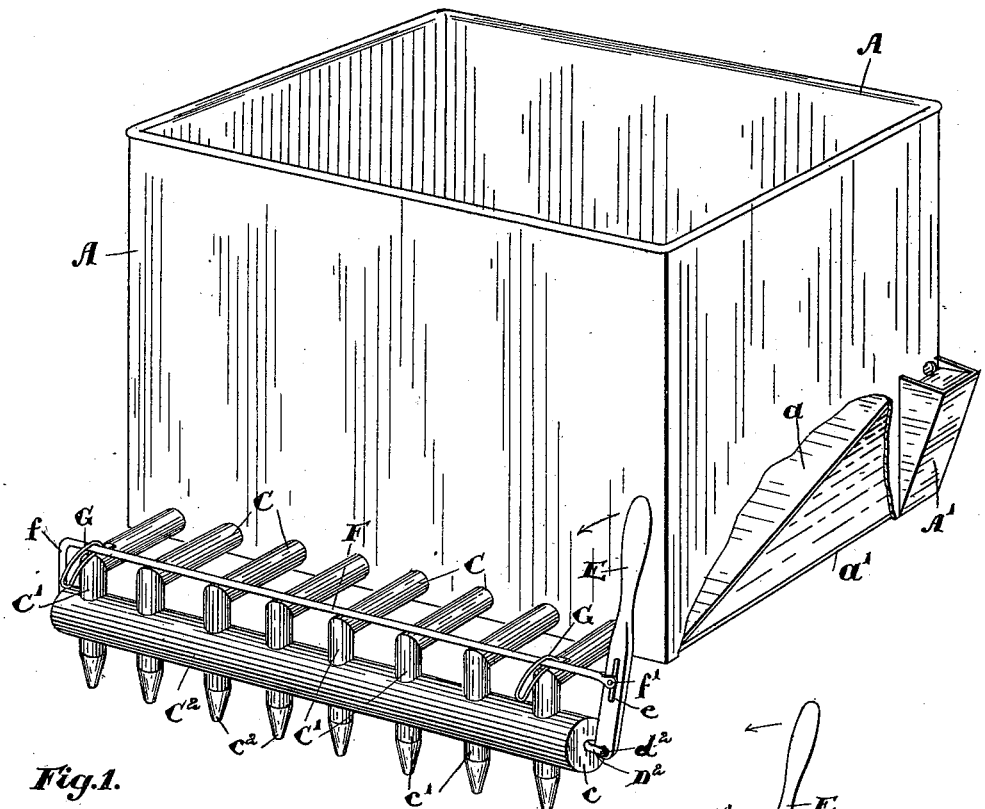
Figure 2:
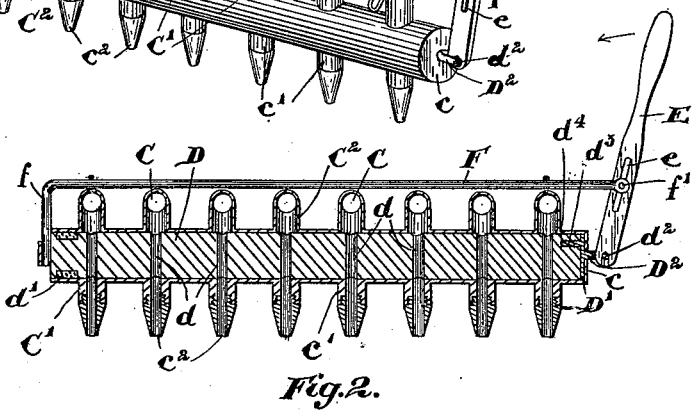

Figure 1 is a perspective view showing my bottle-filling machine. Fig. 2 is a longitudinal section through the faucets and controlling-bar.

In the drawings like letters of reference indicate corresponding parts in each figure.

My invention is more particularly adapted for filling a number of bottles simultaneously with petroleum-jelly, commonly called "vaseline" and sometimes called "petrolatum."

A is the tank, in which the petroleum-jelly is placed, and the tank is provided with an inclined false bottom $a$ and a bottom $a'$, the receptacle formed between which is being filled with hot water, so as to preserve the jelly in a liquid state.

A' is a spout by which the hot water is poured into the receptacle.

C are a series of faucets provided with downwardly-extending portions C'. Intermediate of the length of the downwardly-extending portions I provide the tube $C^2$, which is attached to or forms part of the same and is provided with a closed end $c$.

D is a bar which is provided with a series of holes $d$ of the same size as the lower portion of the faucets $c'$. The extreme lower portion of each faucet is provided with a tapered nozzle $c^2$, which is screwed into the lower portion of the faucets, and this nozzle may be changed for a larger or smaller one, this depending on the size of bottle which it is desired to fill.

$d'$ is a rubber packing fitting in an annular groove $d^2$ near the outer end of the bar D, such packing being designed to prevent the escape of any liquid between the tube $C^2$ and the bar D.

D' is a plate secured to the opposite end of the bar D and provided with a forked end $D^2$, through which and a handle E extends a pin $d^2$. The plate D' is provided with a pin $d^3$, which extends into a hole $d^4$ in the bar D. The handle is provided with a slot $e$.

F is a rod having a bent end $f$, which is suitably secured to the outer end of the bar D. The opposite end of the rod F is forked and is provided with a pin $f'$, which extends through the slot in the handle E.

G are quadrant-shaped slotted brackets secured, preferably, on the end faucets, through which the rod F extends. The slotted brackets G are designed to limit the turning movement of the rod and also to form a guide to hold the handle up in a vertical position. The sides of the slotted bracket G are preferably spring sides and have a tendency to spring in upon the rod, so as to hold it in its uppermost position, and consequently the holes $d$ in the bar D opposite the orifices or holes in the faucets.

The bar D may be moved longitudinally, so as to close the faucets simultaneously by moving the handle E in the direction indicated by arrow in Fig. 2, the pin $d^3$, extending into the hole $d^4$, serving to keep the holes $d$ in their proper position in being moved backward and forward when in use. (See Fig. 2.) The handle E may also be thrown in the direction indicated by arrow in Fig. 1, so as to throw the holes $d$ circumferentially from opposite the holes in the faucets.

In some sort of liquids it would be preferable to throw the handle E one way and in some the other, and this it will be seen I have provided for, so that the bar can be moved either longitudinally or rotated, as may be desired. It will also be noticed that in order to make my machine adaptable to all classes of liquids it can be made either to turn or slide, and it is from this fact also that I am enabled to keep the bar and the orifice therein free from any sugared extractive or other accumulation which would have a tendency to choke or fill up the orifices, and thereby prevent the proper outflow.

What I claim as my invention is—

1. In a bottle-filling machine, in combination a tank, a series of faucets having independent connections with the tank and arranged along the full length of the same, a single tube extending transversely of the faucets and forming an intermediate portion thereof, and a valve arranged in said tube and means for rotating or sliding said valve in said tube, substantially as described.

2. In a bottle-filling machine, the combination with the tank and row of faucets, of the tube attached to or forming part of the depending portion of the faucets, the bar extending therethrough and a handle pivotally connected to the bar, a rod provided with a forked end having a pin extending through a slot in the handle, and the opposite end secured to the opposite end of the bar as and for the purpose specified.

3. In a bottle-filling machine, the combination with the tank and row of faucets, of the tube attached to or forming part of the depending portion of the faucets, the bar extending therethrough, a handle pivotally connected to the bar, a rod provided with a forked end having a pin extending through a slot in the handle and the opposite end secured to the opposite end of the bar, and the guiding-brackets for the rod as and for the purpose specified.

4. The combination with a series of faucets, the tube attached to or forming part of the depending portion thereof, the bar extending through the tube and provided with a series of holes corresponding in size to the orifices of the faucets, the plate located at the inner end of the tube and provided with a pin extending into a hole in the bar and a fork, the handle pivoted in such fork and the rod connecting the handle to the opposite end of the bar as and for the purpose specified.

WILLIAM MURCHISON.

Witnesses:
B. BOYD,
WALTER H. ARMS.